United States Patent [19]

Sakakibara et al.

[11] Patent Number: 4,816,733
[45] Date of Patent: Mar. 28, 1989

[54] TOOL POSITION COMPENSATION METHOD

[75] Inventors: Shinsuke Sakakibara, Komae; Tatsuo Karakama, Hino, both of Japan

[73] Assignee: Fanuc Ltd, Minamitsuru, Japan

[21] Appl. No.: 843,695

[22] PCT Filed: Jul. 13, 1985

[86] PCT No.: PCT/JP85/00396

§ 371 Date: Mar. 4, 1986

§ 102(e) Date: Mar. 4, 1986

[87] PCT Pub. No.: WO86/00729

PCT Pub. Date: Jan. 30, 1986

[30] Foreign Application Priority Data

Jul. 16, 1984 [JP] Japan .................................. 59-147196

[51] Int. Cl.⁴ ............................................. G05B 19/42
[52] U.S. Cl. ...................................... 318/568; 901/40; 318/632
[58] Field of Search ................... 318/568, 568 E, 632; 901/2, 8, 23, 40

[56] References Cited

U.S. PATENT DOCUMENTS

| | | | |
|---|---|---|---|
| 4,497,029 | 1/1985 | Kiyokawa | 318/632 X |
| 4,594,670 | 6/1986 | Itoh | 318/568 X |
| 4,595,989 | 6/1986 | Vasukawa et al. | 318/568 E |
| 4,608,645 | 8/1986 | Niwa | 318/632 X |
| 4,617,502 | 10/1986 | Sakaue | 318/568 |
| 4,620,281 | 10/1986 | Thompson et al. | 318/632 X |
| 4,626,756 | 12/1986 | Inaba et al. | 318/568 X |

Primary Examiner—Benjamin Dobeck
Attorney, Agent, or Firm—Staas & Halsey

[57] ABSTRACT

A tool position compensation method for correcting a tool position when an old tool (16) mounted on a hand (15) of a robot is replaced. Information on the axes of the robot after the new tool is mounted is obtained based on information on the axes of the robot taught before the old tool is replaced, tool position information (TCP1) at that time, and tool position information TCP2) after the new tool is mounted.

7 Claims, 3 Drawing Sheets

REFERENCE CONDITION
TCP 1
TOOL COORDINATES I

SECOND CONDITION
TCP 2
TOOL COORDINATES I

THIRD CONDITION
TCP 3
TOOL COORDINATES

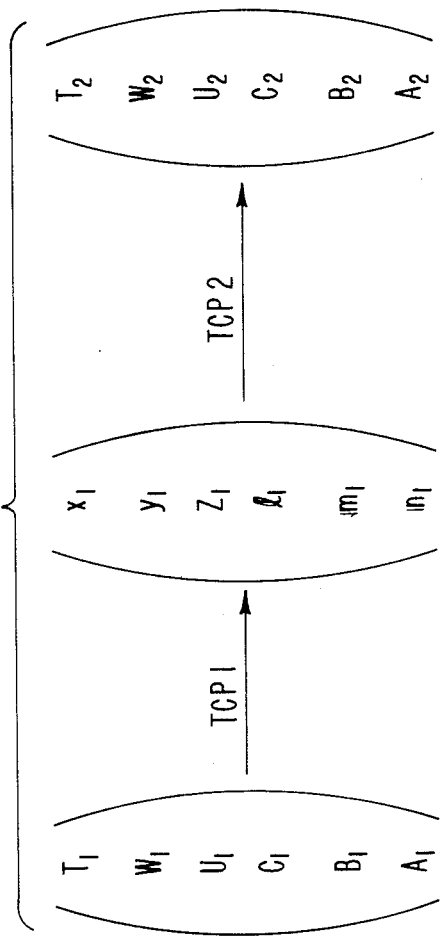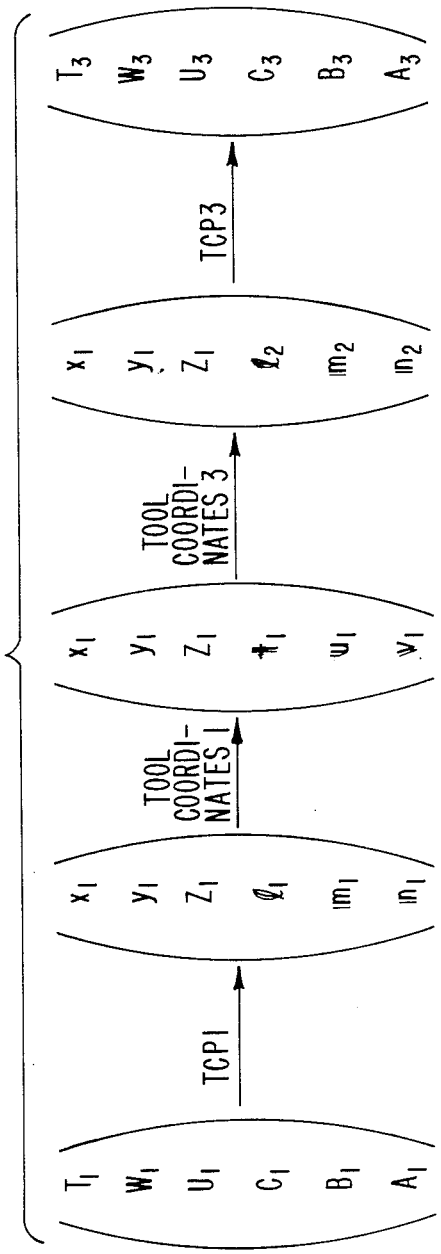

TOOL POSITION COMPENSATION METHOD

BACKGROUND OF THE INVENTION

1. Technical Field

The present invention relates to a tool position compensation method, and more particularly to a tool position compensation method which, when a tool on a hand of an industrial robot is replaced, is capable of easily converting the position of a new tool based on the point data taught by the replaced tool.

2. Description of the Related Art

Industrial robots have found widespread use and are being used in many fields in recent years. As numerical control technology is advanced, more industrial robots are numerically controlled for improved operation. Multi-articulation robots have many axes, and are widely used in the welding process as they can perform a highly sophisticated operation.

FIG. 7 of the accompanying drawings is a perspective view of a general industrial robot which is an articulated robot having six axes. The articulated robot has a T-axis about which an arm assembly rotates, a W-axis about which a lower arm is tilted back and forth, a U-axis about which an upper arm is tilted vertically, an A-axis about which a wrist rotates in a horizontal plane, a B-axis about which the wrist moves in a vertical plane, and a C($\gamma$)-axis about which the wrist rolls, these axes being independently controlled. Designated at 1 in FIG. 7 is a base on which the articulated robot is supported. A T($\theta$)-axis servo motor 2 is mounted on the base 1 for turning the axes about the vertical axis (T-axis). On the T($\theta$)-axis servo motor 2, there is mounted a T($\theta$)-axis unit 3 rotated by the servo motor 2. A W-axis unit 4 is fixedly mounted on the T($\theta$)-axis unit 3, and a W-axis arm 5 is rotatably supported by a pivot shaft 5a on the W-axis unit 4, the W-axis arm 5 being operated by a W-axis drive mechanism 6. A U-axis arm 7 is rotatably supported by a pivot shaft 7a on the distal end of the W-axis arm 5, the U-axis arm 7 being operated by a U-axis drive mechanism 8. A wrist mechanism 9 is mounted on the distal end of the U-axis arm 7. The wrist mechanism 9 is rotated by an A-axis servo motor 10, vertically swung by a B-axis servo motor 11, and rolled by a C-axis servo motor 12. Desired operation is performed by a tool attached to the wrist mechanism 9. An articulated robot of the type described above is disclosed in Japanese Laid-Open Patent Publication No. 59-59371, for example.

A teach and playback robot control process has widely been used in which a tool is mounted onto the hand of a robot. In this process, the robot is manually trained by being moved through steps or points to store such points in a data memory in a control unit. The points can later be traced by the tool automatically. However, the training process is considerably difficult to effect. There are many types of tools available and points to be taught are different from tool to tool. Therefore, when a tool is replaced, the new tool has to be trained entirely, which is quite tedious and low in efficiency.

SUMMARY OF THE INVENTION

It is an object of the present invention to provide a tool position compensation method for the situation where a tool mounted on a hand of a robot is replaced with a new tool the compensation method easily and accurately correcting the tool position of the new tool by obtaining information on the axes of the robot after the new tool has been mounted, on the basis of tool position information prior to the tool change.

According to the present invention, there is provided a tool position compensation method for enabling a robot control device to correct the position of a new tool when a tool mounted on a hand of a robot is replaced, the method comprising the step of enabling the robot control device to obtain information on the axes of the robot after the tool is replaced based on information on the axes of the robot taught before the tool is replaced, tool position information at that time, and tool position information after the tool is replaced.

According to the present invention, the information on the axes of the robot after the tool is replaced is obtained on the basis of the information on the axes of the robot taught before the tool is replaced, the tool position information at that time, and the tool position information after the tool is replaced. Therefore, the taught information prior to the tool change can be effectively utilized, and the tool position compensation due to the tool change can easily and accurately be carried out.

The other objects and features of the present invention will become apparent from the following description.

BRIEF DESCRIPTION OF THE DRAWINGS

FIG. 4 is a diagram illustration the flow of a tool compensation process for pattern 1;

FIG. 5 is a diagram illustration the flow of a tool compensation process for pattern 2;

DESCRIPTION OF THE PREFERRED EMBODIMENT

An embodiment of the present invention will hereinafter be described in detail with reference to the drawings.

Figure 6:
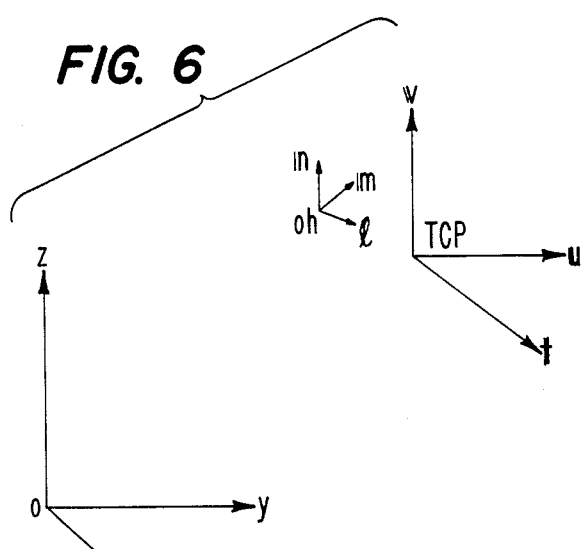
FIG. 6 is a diagram of coordinate systems for a robot, a hand thereof, and a tool.
Figure 7:
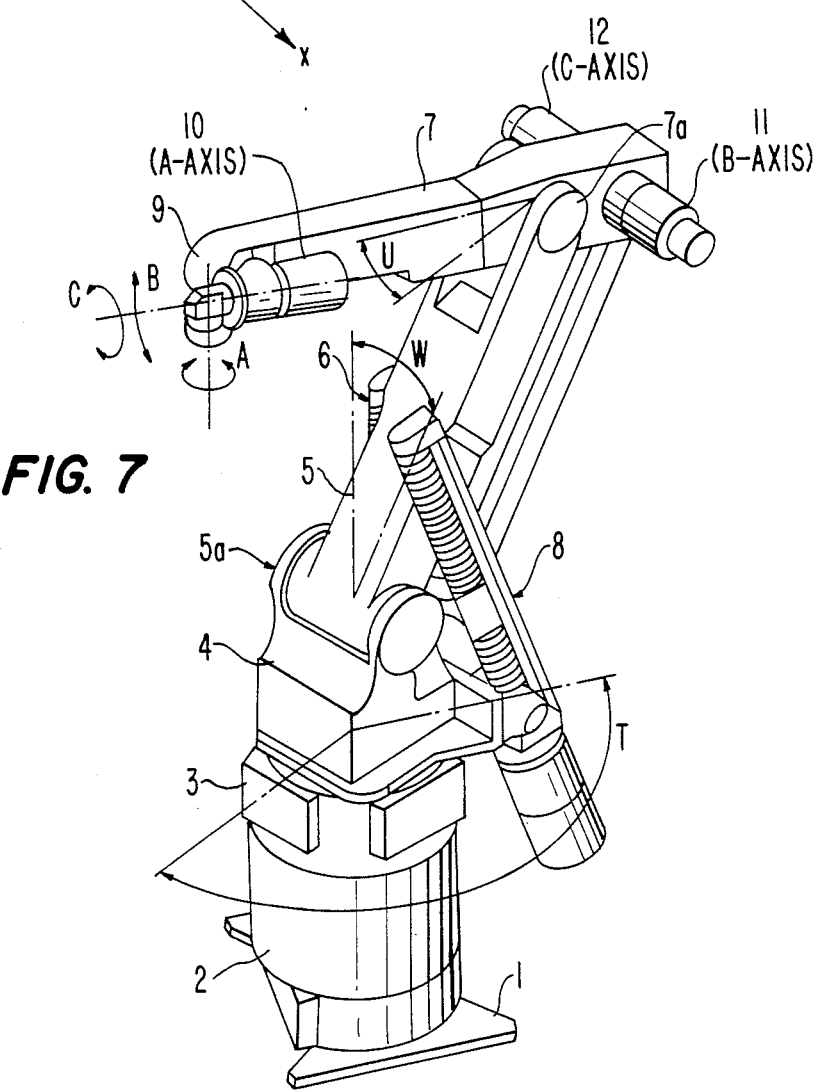
FIG. 7 is a perspective view of a general six-axis-controlled multi-articulation robot.

FIG. 6 is a diagram of coordinate systems for a robot, its hand, and a tool. Designated at X, Y, Z is a reference coordinate system for the robot, having an origin O. Denoted at $\ell$, m, ım are hand posture vectors defining the robot hand coordinate system, t , u , w correspond tool posture vectors defining the tool coordinate system, and TCP correspond to a tool point (also referred to as a tool grip point).

Figure 1A:
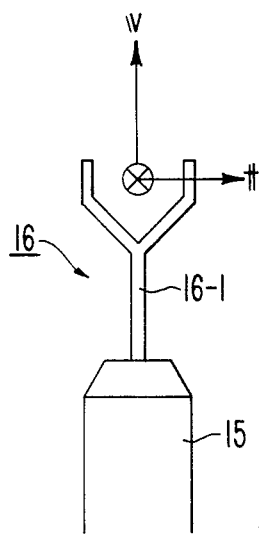
FIGS. 1(a)–1(c) are a set of views used for explaining the manner in which a tool is attached to a robot hand.
Figure 1B:
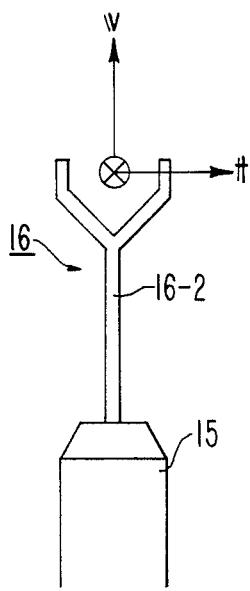
Figure 1C:
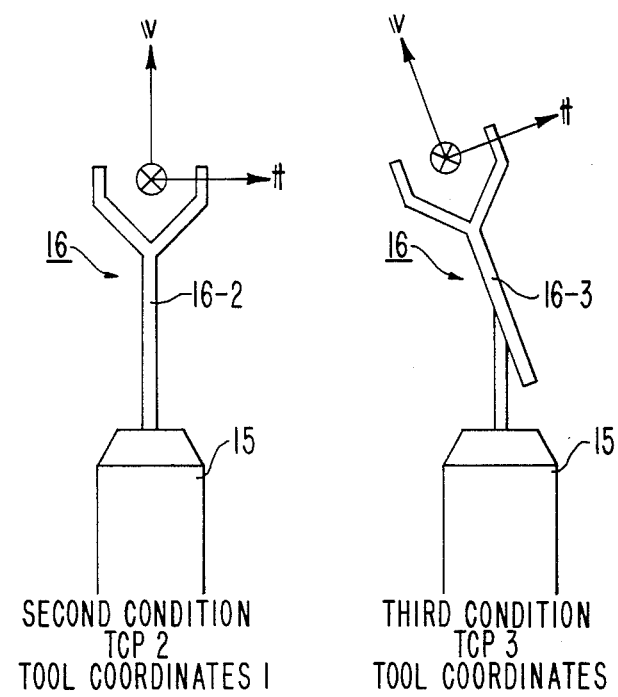

FIGS. 1(a) 1(c) are illustrative of the manner in which a tool 16 is mounted on the distal end of a robot hand 15. FIG. 1(a) (hereinafter referred to as a reference condition) and FIG. 1(b) (hereinafter referred to as a second condition) differ from each other only as to the length of the tool shank, and are defined in the same tool coordinate system (hereinafter referred to as tool coordinate system 1). The relationship between the reference condition and the second condition is defined as a pattern 1.

Where a tool 16-3 is mounted on the distal end of the robot hand 15 as shown in FIG. 1(c) (hereinafter referred to as a third condition), the tool center point TCP and the coordinate system are different from those in the reference condition. The relationship between the reference condition and the third condition is defined as a pattern 3.

Processes of tool position compensation for the patterns 1 and 2 will be described below.

(1) Pattern 1:

FIG. 4 is illustrative of the flow of a tool position compensation process in the pattern 1. Data items ($T_1$, $W_1$, $U_1$, $C_1$, $B_1$, $A_1$) on the axes of the robot which are taught in the reference condition and stored in a data memory in a control device are converted into robot axis data items ($T_2$, $W_2$, $U_2$, $C_2$, $B_2$, $A_2$) usable in the second condition in the following manner:

The control device first computes the position ($x_1$, $y_1$, $z_1$) of the hand grip position in the robot reference coordinates and computes the hand posture vectors $\ell_1$, $^{l}m_1$, $^{l}n_1$ based on the robot axis data items ($T_1$, $W_1$, $U_1$, $C_1$, $B_1$, $A_1$) in the reference condition which are stored in the data memory and also on the tool center point TCP1 obtained in the reference condition. The above computation can easily be carried out since it is a direct conversion.

Then, the control device computes the robot axis data items ($T_2$, $W_2$, $U_2$, $C_2$, $B_2$, $A_2$) based on the above computed data items ($x_1$, $y_1$, $z_1$, $\ell_1$, $^{l}m_1$, $^{l}n_1$) and the tool center point TCP2 selected in the second condition. This computation is an inverse conversion and can easily be carried out.

Therefore, the tool position compensation can easily and accurately be effected for the pattern 1 based on the data items taught before the tool is replaced.

(2) Pattern 2:

FIG. 5 is illustrative of the flow of a tool position compensation process for the pattern 2. Data items ($T_1$, $W_1$, $U_1$, $C_1$, $B_1$, $A_1$) on the axes of the robot which are taught in the reference condition are converted into robot axis data items ($T_3$, $W_3$, $U_3$, $C_3$, $B_3$, $A_3$) usable in the third condition in the following manner:

The control device first computes the position ($x_1$, $y_1$, $z_1$) of the hand grip position in the robot reference coordinates and the hand posture vectors $\ell_1$, $^{l}m_1$, $^{l}n_1$ based on the robot axis data items ($T_1$, $W_1$, $U_1$, $C_1$, $B_1$, $A_1$) taught in the reference condition which are stored in the data memory and also on the tool center point TCP1 obtained in the reference condition. The above computation can easily be carried out since it is a direct conversion.

Then, the control device computes the tool posture vector $t_1$, $u_1$, $v_1$ based on the hand posture vectors $\ell, m, n$, and the tool coordinates 1 obtained in the reference condition.

Then, the control device computes hand posture vector $\ell_2$, $^{l}m_2$, $^{l}n_2$ in the third condition based on the tool posture vectors $t_1$, $u_1$, $v_1$ and the tool coordinates 3 obtained in the third condition.

It is apparent that direct and inverse conversions can always be effected between the hand posture vectors $\ell, m, n$ and the tool posture vectors $t, u, v$ in the tool coordinate system provided the new and old grip positions are known. This is because the following equations can be established through the intermediary of one 3×3 fixed matrix since the relative positions of the hand coordinate system and the tool coordinate system are fixed in space for each tool:

$$\begin{pmatrix} tx\,ux\,vx \\ ty\,uy\,vy \\ tz\,uz\,vz \\ \| \| \| \\ t\ u\ v \end{pmatrix} = \begin{pmatrix} lx\,mx\,nx \\ ly\,my\,ny \\ lz\,mz\,nz \\ \| \| \| \\ l\ m\ n \end{pmatrix} \times (M)$$

$$\begin{pmatrix} lx\,mx\,nx \\ ly\,my\,ny \\ lz\,mz\,nz \end{pmatrix} = \begin{pmatrix} tx\,ux\,vx \\ ty\,uy\,vy \\ tz\,uz\,vz \end{pmatrix} \times T_{(M)}$$

To determine (M), the values of the axes of the robot are used as setting data, and the hand posture vectors $\ell_0$, $^{l}m_0$, $^{l}n_0$ at that time can be derived from the setting data. By setting, $$(\ell_0, ^{l}m_0, ^{l}n_0) = T_{(M)}$$

the conversion between the hand posture vectors $l, m, n$ and the tool posture vectors $t, u, v$ in the tool coordinate system can easily be performed.

Finally, the control device computes the values of the robot axes based on the selected data items ($x_1$, $y_1$, $z_1$, $\ell_2$, $^{l}m_2$, $^{l}n_2$) and the tool center point TCP3 selected in the third condition.

The tool position compensation after the tool has been replaced can be effected in the pattern 2, using the information prior to tool change.

Figure 2:
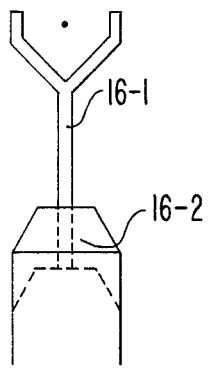
FIG. 2 is a view used for explaining tool position conversion in a first situation (pattern 1)

FIG. 2 shows the conversion for the pattern 1, in which the tool position is corrected in the longitudinal direction of the shank thereof.

Figure 3:
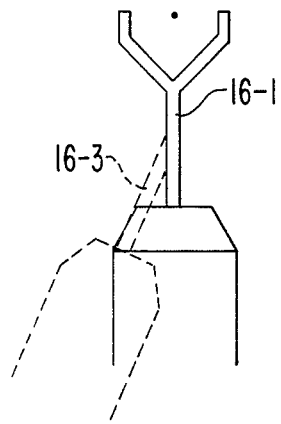
FIG. 3 is a view used for explaining tool position conversion in a second situation (pattern 2)

FIG. 3 is illustrative of the conversion for the pattern 2, in which the change in tool position results changes in the grip point and the grip direction.

Although a certain preferred embodiment has been shown and described, it should be understood that many changes and modifications may be made therein without departing from the scope of the invention.

According to a tool position compensation method of the invention, as described above, when a tool mounted on a hand of a robot is replaced, information on the axes of the robot after the tool is replaced is obtained by employing information of the robot axes which is taught before the tool is replaced and tool position information at that time. Since the tool position compensation arising from a tool change can easily and accurately be carried out, the tool position compensation method of the invention can be preferably used in numerically controlled machine tools, welding machines, and the like which effect various operations.

What is claimed is:

1. A tool position compensation method for enabling a robot control device to correct a position of a new tool when and old tool, mounted on a hand of a robot and maneuverable about axes of the robot, is replaced, the method comprising the steps of:
    (a) obtaining information on the axes of the robot taught before the old tool is replaced, tool position information existing before the old tool is replaced, and tool position information after the new tool is mounted; and
    (b) calculating information on the axes of the robot based upon information obtained in step (a).

2. A tool position compensation method for enabling a robot control device to correct a position of a new tool when an old tool, mounted on a hand of a robot and maneuverable about axes of the robot, is replaced, the method comprising the steps of:
(a) determining a grip position of the hand and hand posture vectors in a reference coordinate system based on information on the axes of the robot in a reference condition and tool position information in the reference condition; and
(b) obtaining information on the axes of the robot after the new tool is mounted based on the information determined in step (a) and tool position information after the new tool is mounted.

3. A tool position compensation method for enabling a robot control device to correct a position of a new tool when an old tool, mounted on a hand of a robot and maneuverable about axes of the robot, is replaced, the method comprising the steps of:
(a) determining a grip position of the hand and hand posture vectors in a reference coordinate system based on information on the axes of the robot in a reference condition and tool position information in the reference condition;
(b) determining tool posture vectors based on the grip position, hand posture vectors and the tool position determined in step (a);
(c) determining hand posture vectors after the new tool is mounted based on the grip position determined in step (a), the tool posture vectors determined in step (b) and the tool position after the new tool is mounted; and
(d) calculating information on the axes of the robot after the new tool is mounted based on the determined information and tool position information after the new tool is mounted.

4. A method for compensating for differences between orientation of a first tool and a second tool when the first tool is replaced with the second tool in a robot hand of a robot, comprising the steps of:
(a) establishing, immediately prior to replacing the first tool, a reference position of the robot hand in terms of a first set of robot axis data for orientation of the first tool with respect to a fixed point in space; and
(b) obtaining, after replacing the first tool, a second set of robot axis data from the first set of robot axis data and a second position of the robot hand, the second position of the robot hand orienting the second tool with the fixed point in space.

5. A method as recited in claim 4, wherein step (a) comprises the steps of:
(ai) determining first robot hand coordinates using the first set of axis data when the first tool is oriented with the fixed point in space, and
(aii) determining first hand posture vectors using the first set of robot axis data when the first tool is oriented with the fixed point in space.

6. A method as recited in claim 5, wherein step (b) comprises the steps of:
(bi) determining second robot hand coordinates using the first set of robot axis data for orientation of the second tool with the fixed point in space;
(bii) calculating an offset from the first set of robot axis data between the first and second robot hand coordinates; and
(biii) applying the offset to the first set of robot axis data to generate the second set of robot axis data.

7. A method as recited in claim 5, wherein step (b) comprises the steps of:
(bi) determining second robot hand coordinates using the first set of robot axis data for orientation of the second tool with the fixed point in space;
(bii) determining second hand posture vectors using the first set of robot axis data for orientation of the second tool with the fixed point in space; and
(biii) generating the second set of robot axis data from the first set of robot axis data in dependence upon differences between the first and second hand posture vectors and the first and second robot hand coordinates.

* * * * *

UNITED STATES PATENT AND TRADEMARK OFFICE
CERTIFICATE OF CORRECTION

PATENT NO. : 4,816,733

DATED : March 28, 1989

INVENTOR(S) : Sakakibara et al.

It is certified that error appears in the above-identified patent and that said Letters Patent is hereby corrected as shown below:

Front page [57], Abstract, line 8, "TCP2)" should be --(TCP2)--.
Col. 2, line 36, "illustration" should be --illustrating--;
      line 38, "illustration" should be --illustrating--;
      line 54, change "," to --. The reference symbols--;
      line 55, before "tool" (first occurrence) insert --to--;
      line 56, change "correspond" to --corresponds--;
      line 58, "1(a) 1(c)" should be --1(a) - 1(c)--.
Col. 3, line 53, "$\ell$, m, n," should be -- $\ell_1$, $m_1$, $n_1$--.
Col. 4, line 18, "( 0, m0, n0)" should be -- $\ell_0$, $m_0$, $n_0$)--;
      line 21, "t, u, v" should be -- $t_1$, $u_1$, $v_1$--;
      line 24, "selected" should be --obtained--;
      line 25, "selected" should be --obtained--;
      line 34, after "results" insert --in--.

Signed and Sealed this

Seventeenth Day of October, 1989

Attest:

DONALD J. QUIGG

Attesting Officer      Commissioner of Patents and Trademarks